United States Patent
Ungari et al.

(10) Patent No.: US 8,650,690 B2
(45) Date of Patent: Feb. 18, 2014

(54) ARTICLE OF FOOTWEAR WITH TUBULAR SOLE ASSEMBLY AND METHOD OF MANUFACTURE

(75) Inventors: Joseph L. Ungari, Seattle, WA (US); Richard L. Watkins, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 441 days.

(21) Appl. No.: 13/041,736

(22) Filed: Mar. 7, 2011

(65) Prior Publication Data

US 2011/0154584 A1 Jun. 30, 2011

Related U.S. Application Data

(62) Division of application No. 11/870,478, filed on Oct. 11, 2007, now Pat. No. 7,926,204.

(51) Int. Cl.
*B22D 25/00* (2006.01)

(52) U.S. Cl.
USPC ........................................................ 12/142 R

(58) Field of Classification Search
USPC ............. 12/142 R, 146 B, 146 BR; 36/28, 37
See application file for complete search history.

(56) References Cited

U.S. PATENT DOCUMENTS

| | | | |
|---|---|---|---|
| 3,059,251 A | 10/1962 | Pollock | |
| 3,251,728 A | 5/1966 | Humbert et al. | |
| 3,481,455 A | 12/1969 | Graham et al. | |
| 3,503,840 A | 3/1970 | Parrish | |
| 3,552,044 A | 1/1971 | Wiele | |
| 3,624,191 A | 11/1971 | Weight | |
| 3,719,965 A | 3/1973 | Chevallereau | |
| 3,854,227 A * | 12/1974 | Borisuck et al. | 36/4 |
| 3,887,750 A | 6/1975 | Duckett et al. | |
| 4,272,898 A | 6/1981 | Tansill | |
| 4,309,376 A * | 1/1982 | Ueno et al. | 264/241 |
| 4,502,234 A | 3/1985 | Schaefer et al. | |
| 4,593,482 A | 6/1986 | Mayer | |
| 4,862,539 A | 9/1989 | Bokich | |
| 4,864,738 A | 9/1989 | Horovitz | |
| 4,914,836 A | 4/1990 | Horovitz | |
| 4,952,450 A | 8/1990 | Noel | |
| 4,984,376 A | 1/1991 | Walter et al. | |
| 5,005,300 A | 4/1991 | Diaz et al. | |
| 5,083,361 A | 1/1992 | Rudy | |
| 5,092,060 A | 3/1992 | Frachey et al. | |
| 5,117,566 A | 6/1992 | Lloyd et al. | |
| 5,194,311 A | 3/1993 | Baymak et al. | |

(Continued)

FOREIGN PATENT DOCUMENTS

| | | |
|---|---|---|
| JP | 04122301 | 4/1992 |
| JP | 08061410 | 8/1996 |

OTHER PUBLICATIONS

Office Action issued Aug. 6, 2012 in related European Patent Application No. 08837058.0.

(Continued)

*Primary Examiner* — Marie Patterson
(74) *Attorney, Agent, or Firm* — Banner & Witcoff, Ltd.

(57) ABSTRACT

An article of footwear includes an upper and a sole assembly secured to the upper. The sole assembly includes a mat formed of at least one randomly dispersed extruded tubular member, each tubular member being hollow in an in-use condition in which the mat provides support for a user's foot.

10 Claims, 5 Drawing Sheets

(56) References Cited

U.S. PATENT DOCUMENTS

| | | |
|---|---|---|
| 5,233,767 A | 8/1993 | Kramer |
| 5,580,507 A * | 12/1996 | Williamson et al. .......... 264/221 |
| 5,972,463 A | 10/1999 | Martin et al. |
| 5,993,943 A | 11/1999 | Bodaghi et al. |
| 6,061,928 A | 5/2000 | Nichols |
| 6,139,308 A | 10/2000 | Berrigan et al. |
| 6,282,814 B1 | 9/2001 | Krafsur et al. |
| 7,926,204 B2 * | 4/2011 | Ungari et al. ................. 36/25 R |
| 8,234,736 B2 * | 8/2012 | Koo et al. ................... 12/146 B |
| 2001/0016992 A1 | 8/2001 | Gross |
| 2002/0125611 A1 * | 9/2002 | Yin ............................... 264/244 |
| 2005/0120591 A1 | 6/2005 | Andrew |
| 2006/0061000 A1 * | 3/2006 | Chun et al. ................... 264/45.4 |
| 2007/0001336 A1 | 1/2007 | Nishibori et al. |

OTHER PUBLICATIONS

International Search Report and Written Opinion mailed Feb. 24, 2009 in corresponding PCT Application No. PCT/US2008/79455.

* cited by examiner

ARTICLE OF FOOTWEAR WITH TUBULAR SOLE ASSEMBLY AND METHOD OF MANUFACTURE

RELATED APPLICATIONS

This application is a divisional of U.S. Ser. No. 11/870,478, filed Oct. 11, 2007, which is entirely incorporated herein by reference.

FIELD OF THE INVENTION

This invention relates generally to an article of footwear, and, in particular, to an article of footwear including a tubular sole assembly and a method of manufacture

BACKGROUND OF THE INVENTION

Conventional articles of athletic footwear include two primary elements, an upper and a sole structure. The upper provides a covering for the foot that comfortably receives and securely positions the foot with respect to the sole structure. In addition, the upper may have a configuration that protects the foot and provides ventilation, thereby cooling the foot and removing perspiration. The sole structure is secured to a lower portion of the upper and is generally positioned between the foot and the ground. In addition to attenuating ground reaction forces, the sole structure may provide fraction, control foot motions (e.g., by resisting over pronation), and impart stability, for example. Accordingly, the upper and the sole structure operate cooperatively to provide a comfortable structure that is suited for a wide variety of activities, such as walking and running.

The sole structure generally incorporates multiple layers that are conventionally referred to as an insole, a midsole, and an outsole. The insole is a thin, compressible member located within the upper and adjacent to a plantar (i.e., lower) surface of the foot to enhance footwear comfort. The midsole, which is conventionally secured to the upper along the length of the upper, forms a middle layer of the sole structure and is primarily responsible for attenuating ground reaction forces. The outsole forms the ground-contacting element of footwear and is usually fashioned from a durable, wear-resistant material that includes texturing to improve traction.

The conventional midsole is primarily formed from a resilient, polymer foam material, such as polyurethane or ethylvinylacetate, that extends throughout the length of the footwear. The properties of the polymer foam material in the midsole are primarily dependent upon factors that include the dimensional configuration of the midsole and the specific characteristics of the material selected for the polymer foam, including the density of the polymer foam material. By varying these factors throughout the midsole, the relative stiffness and degree of ground reaction force attenuation may be altered to meet the specific demands of the activity for which the footwear is intended to be used. In addition to polymer foam materials, conventional midsoles may include, for example, one or more fluid-filled bladders and moderators.

It would be desirable to provide a sole assembly that reduces or overcomes some or all of the difficulties inherent in prior known devices. Particular objects and advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide a sole assembly for an article of footwear. In accordance with a first aspect, an article of footwear includes an upper and a sole assembly secured to the upper. The sole assembly includes a mat formed of at least one randomly dispersed extruded tubular member, each tubular member being hollow in an in-use condition in which the mat provides support for a user's foot.

In accordance with another aspect, an article of footwear includes an upper and a sole assembly secured to the upper. The sole assembly includes a mat formed of a plurality of randomly dispersed extruded tubular members, each tubular member being hollow in an in-use condition in which the mat provides support for a user's foot. The mat is positioned in a heel portion of the sole assembly. An outsole is secured to the sole assembly.

In accordance with a further aspect, a method of manufacturing a portion of a sole assembly includes the steps of providing a first mold portion having a recess formed therein; extruding a mat formed of at least one randomly dispersed extruded tubular member into the recess; and curing the mat.

In accordance with yet another aspect, a method of manufacturing a portion of a sole assembly includes the steps of extruding a mat preform formed of a randomly dispersed extruded tubular member, cutting the mat preform to provide a mat of tubular members shaped to form a portion of a sole assembly for an article of footwear with each tubular member being hollow in an in-use condition in which the mat provides support for a user's foot; and curing the mat.

These and additional features and advantages disclosed here will be further understood from the following detailed disclosure of certain embodiments.

Figure 1:
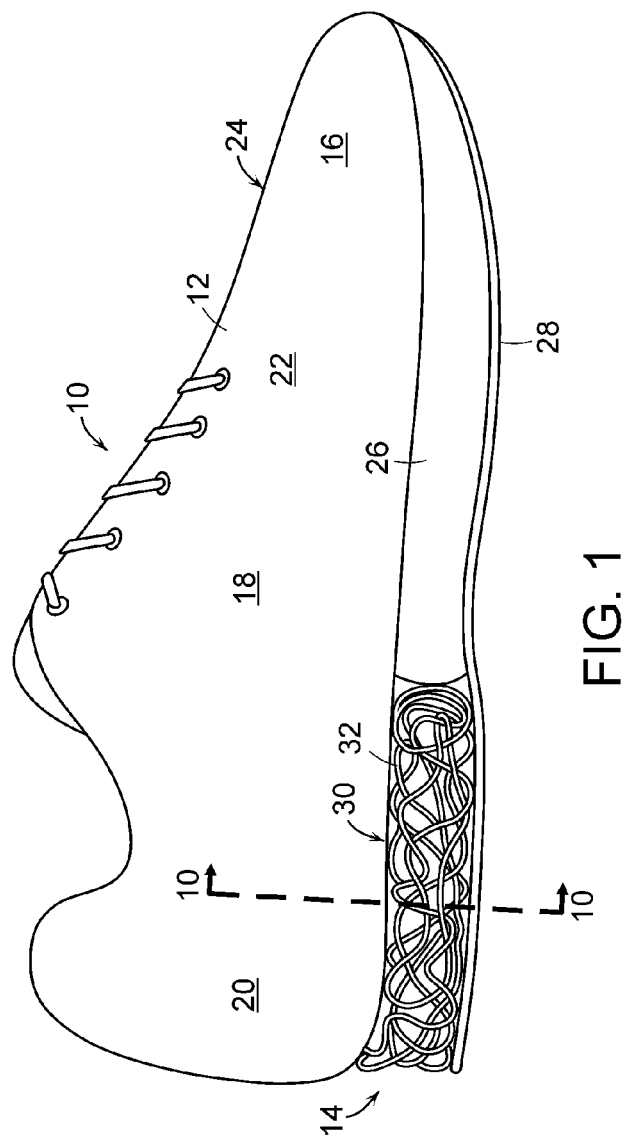
FIG. 1 is an elevation view of an article of footwear including a tubular sole assembly.

The figures referred to above are not drawn necessarily to scale, should be understood to provide a representation of particular embodiments of the invention, and are merely conceptual in nature and illustrative of the principles involved. Some features of the article of footwear including a tubular sole assembly depicted in the drawings have been enlarged or distorted relative to others to facilitate explanation and understanding. The same reference numbers are used in the drawings for similar or identical components and features shown in various alternative embodiments. Articles of footwear including a tubular sole assembly as disclosed herein would have configurations and components determined, in part, by the intended application and environment in which they are used.

DETAILED DESCRIPTION OF CERTAIN PREFERRED EMBODIMENTS

The following discussion and accompanying figures disclose an article of footwear 10 in accordance with aspects of the present invention. Footwear 10 is depicted in the figures and discussed below as having a configuration that is suitable for athletic activities, particularly running. The concepts disclosed with respect to footwear 10 may, however, be applied to footwear styles that are specifically designed for a wide range of other athletic activities, including basketball, baseball, football, soccer, walking, and hiking, for example, and may also be applied to various non-athletic footwear styles, including dress shoes, loafers, sandals, and work boots. Accordingly, one skilled in the relevant art will recognize that the concepts disclosed herein may be applied to a wide range of footwear styles and are not limited to the specific embodiments discussed below and depicted in the figures.

Footwear 10 is depicted in FIG. 1 and includes an upper 12 and a sole assembly 14. For purposes of reference, footwear 10 may be divided into three general regions: a forefoot region 16, a midfoot region 18, and a heel region 20, as defined in FIG. 1. Forefoot region 16 generally includes portions of footwear 10 corresponding with the toes and the joints connecting the metatarsals with the phalanges. Midfoot region 18 generally includes portions of footwear 10 corresponding with the arch area of the foot, and heel region 20 corresponds with rear portions of the foot, including the calcaneus bone. Footwear 10 also includes a medial side 22 and an opposite lateral side 24. Medial side 22 and lateral side 24 extend through each of regions 16-20 and correspond with opposite sides of footwear 10.

Regions 16-20 and sides 22-24 are not intended to demarcate precise areas of footwear 10. Rather, regions 16-20 and sides 22-24 are intended to represent general areas of footwear 10 that provide a frame of reference during the following discussion. Although regions 16-20 and sides 22-24 apply generally to footwear 10, references to regions 16-20 and sides 22-24 may also apply specifically to upper 12, sole assembly 14, or an individual component or portion within either of upper 12 or sole assembly 14, or any other component of footwear 10.

Unless otherwise stated, or otherwise clear from the context below, directional terms used herein, such as rearwardly, forwardly, inwardly, downwardly, upwardly, etc., refer to directions relative to footwear 10 itself. Footwear 10 is shown in FIG. 1 to be disposed substantially horizontally, as it would be positioned on a horizontal surface when worn by a wearer. However, it is to be appreciated that footwear 10 need not be limited to such an orientation. Thus, in the illustrated embodiment of FIG. 1, rearwardly is toward heel portion 20, that is, to the left as seen in FIG. 1. Naturally, forwardly is toward forefoot portion 16, that is, to the right as seen in FIG. 1, and downwardly is toward the bottom of the page as seen in FIG. 1. Inwardly is toward the center of footwear 10, and outwardly is toward the outer peripheral edge of footwear 10.

Upper 12 is formed from various material elements that are stitched or adhesively-bonded together to form an interior void that comfortably receives a foot and secures the position of the foot relative to sole assembly 14. A variety of materials are suitable for upper 12, including the materials that are conventionally utilized in footwear uppers. Accordingly, upper 12 may be formed from combinations of leather, synthetic leather, natural or synthetic textiles, polymer sheets, polymer foams, mesh textiles, felts, non-woven polymers, or rubber materials, for example. The interior of upper 22 may have foam elements for enhancing the comfort of footwear 10, and the interior surface may include a moisture-wicking textile for removing excess moisture from the area immediately surrounding the foot.

Sole assembly 14 may be secured to upper 22 by an adhesive, or any other suitable fastening means. Sole assembly 14, which is generally disposed between the foot of the wearer and the ground, provides attenuation of ground reaction forces (i.e., imparting cushioning), traction, and may control foot motions, such as pronation. As with conventional articles of footwear, sole assembly 14 includes an insole (not shown) located within upper 12, a midsole 26, and an outsole 28. Midsole 26 is attached to upper 22 and functions as the primary shock-attenuating and energy-absorbing component of footwear 10. Suitable materials for midsole 26 are any of the conventional polymer foams that are utilized in footwear midsoles, including ethylvinylacetate and polyurethane foam.

Outsole 28 is secured to a lower surface of midsole 26 to provide wear-resistance. In addition, outsole 28 may be textured to enhance the fraction (e.g., friction) properties between footwear 10 and the ground. Suitable materials for outsole 28 include any of the conventional rubber materials that are utilized in footwear outsoles, such as carbon black rubber compound. Other suitable materials for outsole 28 will become readily apparent to those skilled in the art, given the benefit of this disclosure.

Midsole 26 includes a mat 30 formed of at least one hollow tubular member 32 that acts as a cushioning element for footwear 10. The tubular member 32 of mat 30 is preferably formed in a random non-woven pattern. In certain embodiments, tubular member 32 may be formed in a controlled non-woven pattern.

In certain embodiments, tubular member 32 is formed of a thermoplastic elastomer. For example, tubular member 32 may be formed of thermoplastic polyurethane (TPU), TPU alloys, elastomeric nylons, poly (styrene-butadiene-styrene) or "SBS", poly (styrene-ethylene-butadiene-styrene) or "SEBS", a styrenic block copolymer elastomer, an amide ether block copolymer, a polyolefin elastomer, etc. Mat 30 can be formed of a single tubular member 32 or a plurality of tubular members 32.

Each tubular member 32 is hollow in an in-use condition in which mat 30 of midsole 26 provides support for a user's foot. That is, tubular members 32 provide support for user's foot solely from the structural strength provided by their hollow tubular structure, and from the combined structural support of the overlapping non-woven structure of a singular tubular member 32 or multiple tubular members 32. Tubular members 32 are free from any substance within their core that would provide support for a user's foot.

As shown in FIG. 1, mat 30 is positioned only in heel portion 20 of midsole 26. It is to be appreciated that mat 30 may be located in any one of regions 16-20 of midsole 26 or in any combination of regions 16-20 of midsole 26. Thus, mat 30 may extend along the complete length of footwear 10 or along only a portion of footwear 10. In addition, it is to be appreciated that multiple mats 30 may be located at any location within midsole 26.

In certain embodiments, as illustrated in FIG. 1, at least a portion of mat 30 and its tubular members 32 are visible from the exterior of footwear 10. It is to be appreciated that in certain embodiments, mat 30 and tubular members 32 are not visible from the exterior of footwear 10 and are concealed within sole assembly 14.

Figure 2:
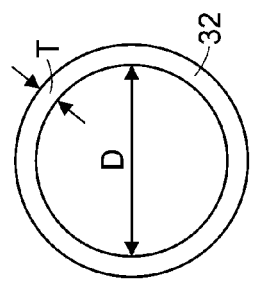
FIG. 2 is an end view of a tubular member of the article of footwear of FIG. 1.

As seen in FIG. 2, tubular member 32 may be substantially cylindrical with a diameter D, shown here as an internal diameter, and a wall thickness T. It is to be appreciated that diameter D or wall thickness T or both can be varied. In certain embodiments, diameter D can range from approximately 1 mm to approximately 1 cm. In certain embodiments, thickness T can range from approximately 10 μm to approximately 1 mm. It is to be appreciated that the thickness and diameter D of tubular member 32 may be varied from one article of footwear 10 to another and that they may also vary within an individual article of footwear 10. For example, mat 30 can be designed such that wall thickness T is greater along lateral portion 24 of midsole 26 in order to provide greater support along lateral portion 24. Further, wall thickness T may be greater in heel portion 20 in order to provide greater support to absorb the impact of heel strike. Thus, it is to be appreciated that any portion or portions of a tubular member 32 may have a larger or smaller wall thickness T and/or diameter D as compared to any other portion or portions of the tubular member 32.

Although the embodiment of tubular member 30 shown in FIG. 2 has a substantially circular cross-section, it is to be appreciated that tubular member 30 may have any desired profile. Thus, tubular member could be elliptical, rectangular or have any other regular or irregular polygonal shape.

In certain embodiments, mat 30 could be removable from footwear 10, which would allow a user to replace mat 30 when its cushioning properties have diminished.

Figure 3:
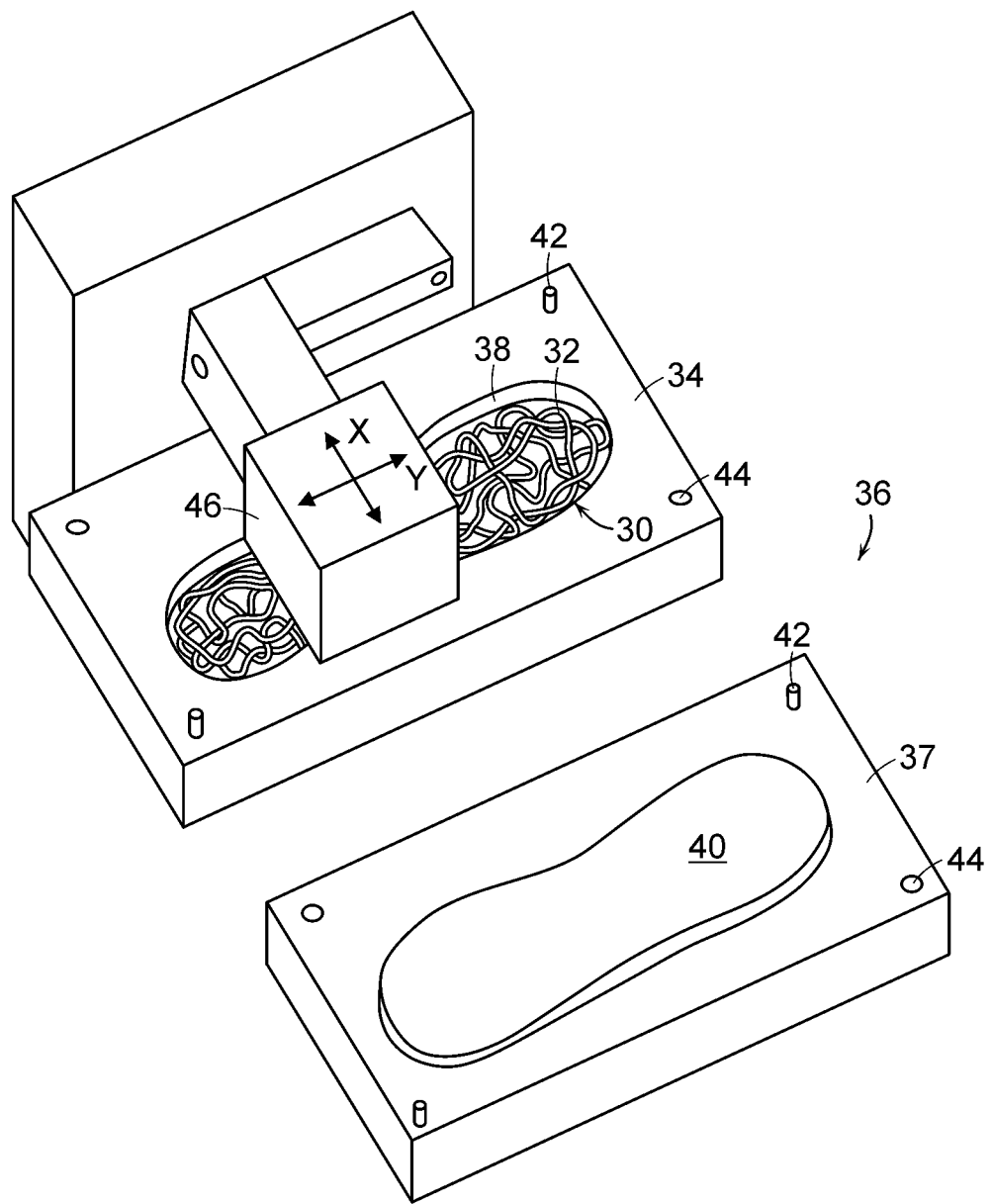
FIG. 3 is a perspective view of a mold assembly and extruder used to produce the article of footwear of FIG. 1.
Figure 4:
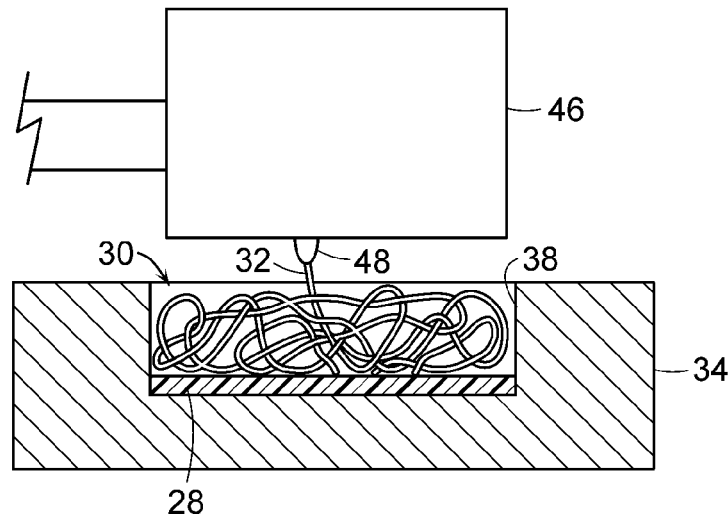
FIG. 4 is an elevation view, partially in section, of a portion of the mold assembly and the extruder of FIG. 3.

One method of manufacturing mat 30 is illustrated in FIGS. 3-4. A first portion 34 of a mold 36 includes a substantially foot-shaped recess 38. An extruder 46 having a die head 48 extrudes tubular member 32 into recess 38. Extruder 46 is configured to move in the X and Y directions as seen in FIG. 1, in order to fill recess 38 to a desired level, thereby forming mat 30 with a desired thickness and density. As seen in the embodiment illustrated in FIG. 1, mat 30 is being formed to extend throughout forefoot region 16, midfoot region 18 and heel region 20 of footwear 10.

In certain embodiments, as the material is extruded it is hot enough that adhesion can develop between contacting points of tubular member 32. Thus, at least a portion of a selected tubular member is adhered to at least one of that selected tubular member and another tubular member.

By moving die head 48 along the X and Y directions, a pattern of controlled thickness can be created for mat 30, thereby ensuring that midsole 26 has a desired profile or height in any desired portion of midsole 26. Thus, mat 30 may have a different height in any of its forefoot, midsole and heel regions 16-20. Once mat 30 has the desired profile, it is then cured and trimmed if necessary. Mat 30 can than be adhesively secured to upper 12 and outsole 28 in known fashion to form footwear 10.

In certain embodiments, mold 36 includes a second portion 37 having a substantially foot shaped projection 40 formed thereon. Projection 40 is received in recess 38 of first portion 34 when first portion 34 and second portion 37 of mold 36 are mated together, thereby helping to form mat 30 to a desired profile as it is cured.

One or more projections 42 may be formed on one or both of first and second portions 34, 37 of mold 36, each of which may be received in a corresponding recess 44 formed in first or second portion 34, 37, thereby helping register first and second portions of mold 36 with respect to one another.

It is to be appreciated that the recess in first portion 34 can have any shape. As seen in FIG. 3, recess 38 is substantially foot shaped, producing a substantially foot shaped mat. In other embodiments, the recess can be shaped to form a heel portion of sole assembly 14, as seen in FIG. 1. Thus, it can be appreciated that the recess can take any desired shape so as to produce a corresponding mat with any desired shape to be positioned at a desired location with sole assembly 14.

In the embodiment illustrated in FIG. 4, an outsole 28 is placed in the bottom of recess 38 prior to tubular member 32 being extruded therein. Having outsole 28 formed of an elastomer allows a melt adhesive bond to be formed between tubular member 32 and outsole 28 during the extrusion process, thereby ensuring that outsole 28 is adequately secured to midsole 26.

Tubular member 30 may be sealed at opposed ends thereof in order to retain fluid, e.g., air, therein, thereby providing a pneumatic cushioning effect in addition to the visco-elastic cushioning provided by the structure of elastomeric tubular member 30 itself. Additionally, tubular member 30 may be sealed at one or more internal locations along its length, thereby providing a tubular member with multiple tubular portions.

Figure 5:
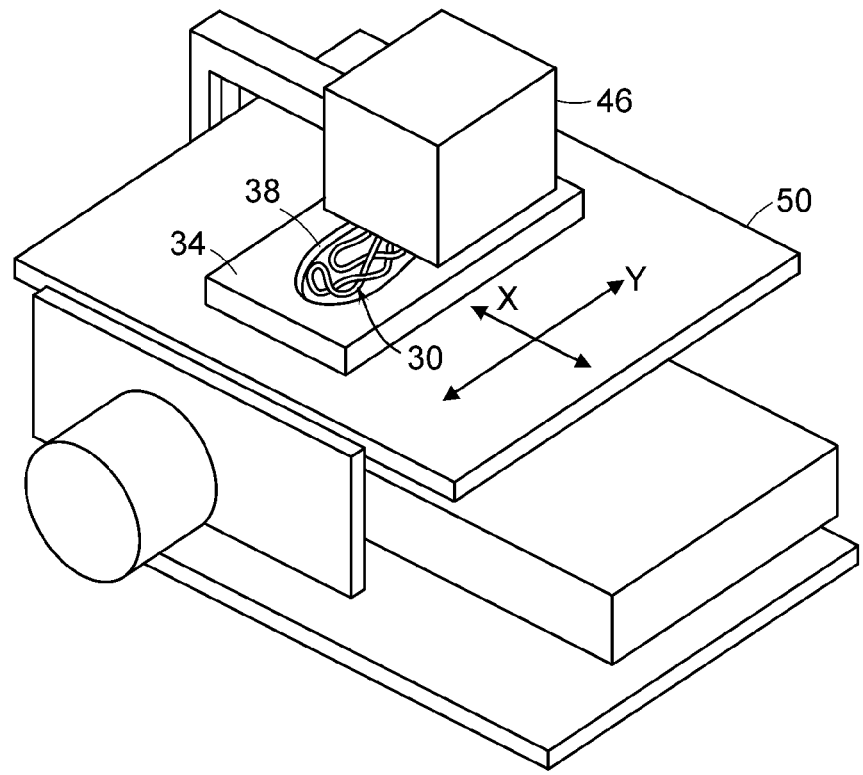
FIG. 5 is a perspective view of an alternative embodiment of a mold assembly and extruder used to produce the article of footwear of FIG. 1.

Another method of forming mat 30 is illustrated in FIG. 5, in which extruder 46 is in a fixed position and mold 34 is seated on a movable X-Y table 50. In this embodiment, as extruder head 48 extrudes tubular member 32 into recess 38, mold 34 is moved in the X and Y directions by manipulating X-Y table 50 so as to form mat 30 with a desired density and thickness throughout mold 34.

Figure 7:
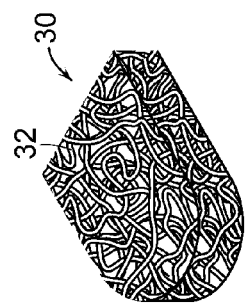
FIG. 7 is a perspective view of a mat of tubular members cut from the mat preform of FIG. 6 and used in the article of footwear of FIG. 1.
Figure 6:
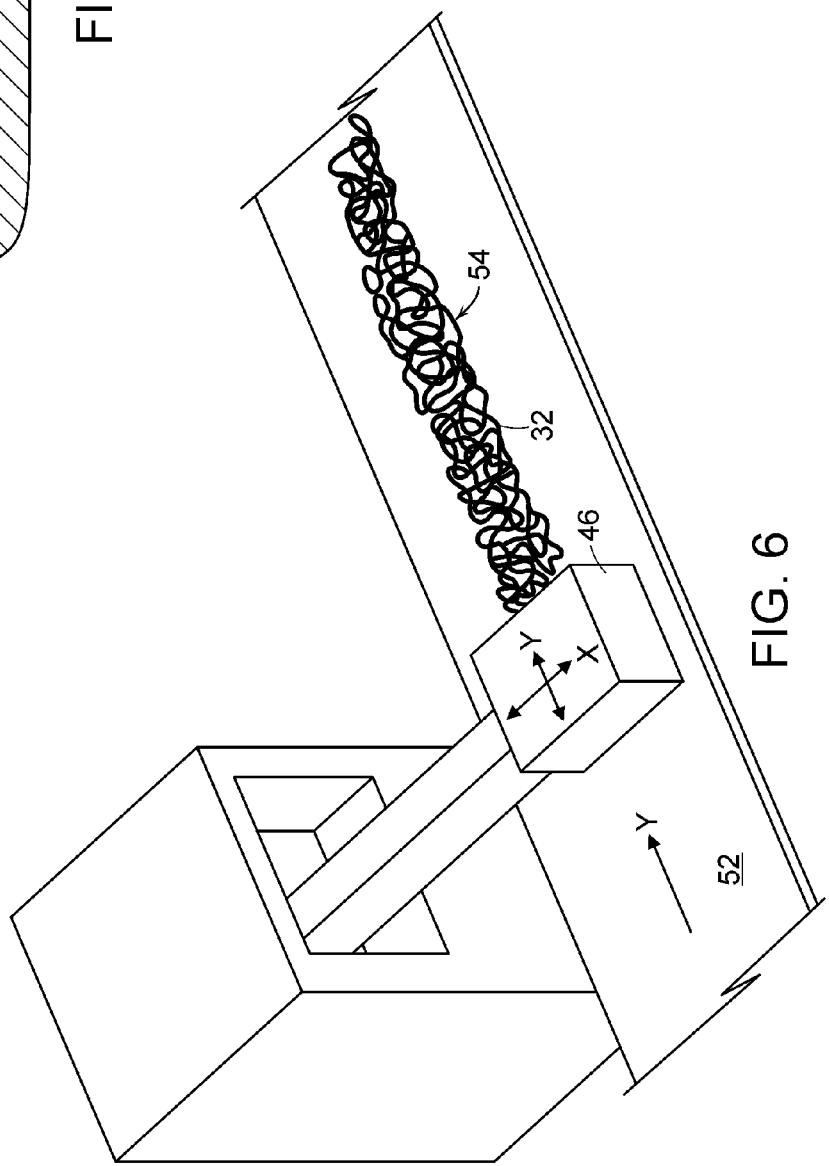
FIG. 6 is a perspective view of an extruder used to extrude a mat preform onto a moving belt 52.

Another method of forming mat 30 is illustrated in FIG. 6, in which extruder 46 is movable in the X and Y directions and extrudes a tubular member 32 onto a moving belt 52. That is, the tubular member 32 is extruded longitudinally and transversely along belt 52. As illustrated here, belt 52 is moving in the Y direction. As tubular member 32 is continuously extruded from die head 48, an elongated mat preform 54 is formed along belt 52. The desired mat 30, seen in FIG. 7, is then die-cut or otherwise cut from elongated mat preform 54 and subsequently secured to upper 12 and outsole 28 to form footwear 10.

In such an embodiment, a plurality of tubular members 32 is created when mat 30 is cut from mat preform 54. Each of these tubular members 32 is bonded to at least another tubular member 32 due to the heat of extrusion as mat preform 54 is produced.

Figure 8:
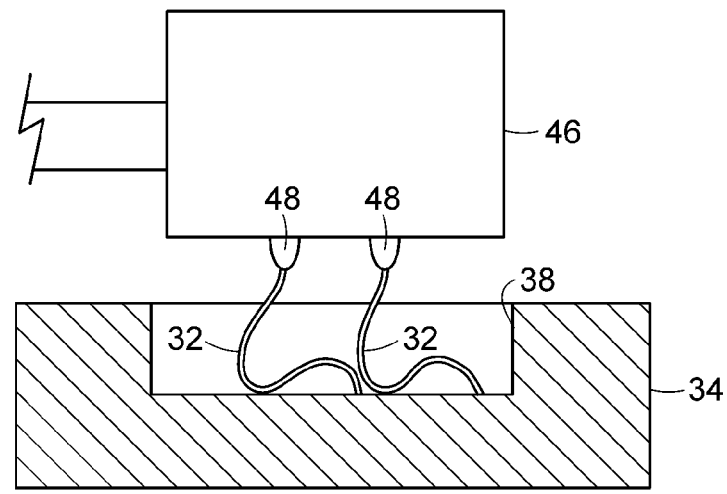
FIG. 8 is an elevation view, partially in section, of an extruder having a plurality of die heads in use with a mold assembly to produce the article of footwear of FIG. 1.

As can be seen in FIG. 8, extruder 46 may have a plurality of die heads 48. In the illustrated embodiment, two die heads 48 are provided on extruder 46 and are used to extrude a pair of parallel tubular members 32 as mat 30 is formed in recess 38. It is to be appreciated that any number of die heads 38 can be provided on extruder 46. It is also to be appreciated that the tubular members produced by such a die head may be formed of different materials, and may have different geometries (including wall thickness and diameter, for example), different shapes, and different colors.

Figure 9:
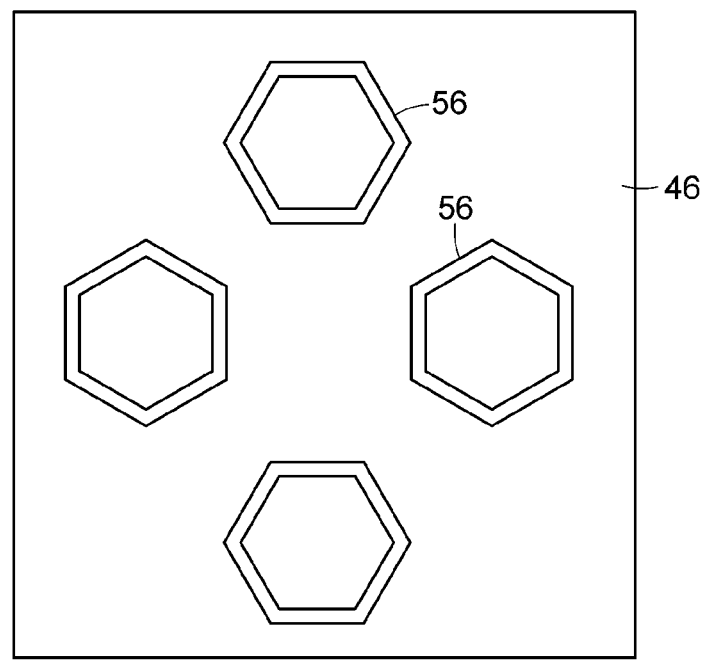
FIG. 9 is a plan view of a head of an alternative embodiment of an extruder for use in producing the article of footwear of FIG. 1.

As noted above, die heads 48 need not extrude a substantially cylindrical tubular member 32. As seen in the embodiment illustrated in FIG. 9, extruder 46 may have an array of die heads 56 with substantially hexagon-shaped orifices. As noted above, any number of die heads 56 can be associated with extruder 46, and the die heads may have any desired shape. Although extruder 46 is illustrated here with four similar die heads 56, it is to be appreciated that extruder 46 may have any combination of similar and dissimilar shaped die heads 56.

Figure 10:
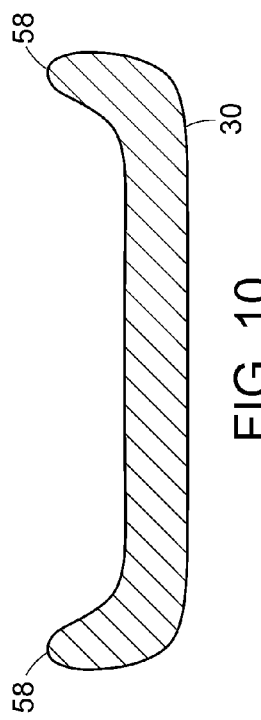
FIG. 10 is a section view of the mat of FIG. 1, taken along line 10-10.

A section view of a heel portion 20 of mat 30 of footwear 10 is shown in FIG. 10. It is to be appreciated that such a mat 30 can be formed in many different ways. For example, as described above in connection with FIG. 3, mat 30 can be formed by extruding tubular member(s) 32 into a recess 38 of a mold 36, which may then be further processed to produce a desired shape for mat 30. In other embodiments, tubular member(s) 32 can be layered to produce mat 30. Thus, by molding or layering, or by any other method, mat 30 can be produced with a thicker portion about a peripheral edge 58 of mat 30 to provide a cupped edge. Similarly, a thicker portion can be deposited, molded, or otherwise formed in a midfoot portion 18 of mat 30 to provide an arch, or in forefoot portion 16 to provide a toe cap, or in any other desired portion of mat 30.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method of manufacturing a portion of a sole assembly comprising the steps of:
   providing a first mold portion having a recess formed therein;
   extruding a mat formed of at least one randomly dispersed extruded hollow tubular member into the recess; and
   curing the mat.

2. The method of claim 1, wherein a wall thickness of the tubular member varies along its length.

3. The method of claim 1, wherein a diameter of the tubular member varies along its length.

4. The method of claim 1, wherein the recess is substantially foot shaped.

5. The method of claim 1, further comprising the steps of:
   providing a second mold portion having a projection formed thereon; and
   the projection being inserted into the recess after the mat is extruded into the recess and before the mat is cured.

6. The method of claim 1, wherein the mat is extruded from a plurality of extrusion heads simultaneously.

7. A method of manufacturing a portion of a sole assembly comprising the steps of:
   extruding a mat preform formed of a randomly dispersed extruded tubular member;
   cutting the mat preform to provide a mat of tubular members shaped to form a portion of a sole assembly for an article of footwear, each tubular member being hollow in an in-use condition in which the mat provides support for a user's foot; and
   curing the mat.

8. The method of claim 7, wherein the mat is extruded onto a moving belt and the tubular member is extruded longitudinally and transversely along the belt.

9. The method of claim 7, wherein a wall thickness of the tubular member varies along its length.

10. The method of claim 7, wherein a diameter of the tubular member varies along its length.

* * * * *